United States Patent [19]
Hug

[11] 3,722,760
[45] Mar. 27, 1973

[54] DISPENSING VALVE HAVING POSITIVE TILT STEM

[75] Inventor: Richard C. Hug, St. Louis, Mo.

[73] Assignee: Clayton Corporation, St. Louis, Mo.

[22] Filed: Dec. 23, 1971

[21] Appl. No.: 211,593

[52] U.S. Cl. .......................................... 222/402.22
[51] Int. Cl. .............................................. B65d 83/14
[58] Field of Search......... 222/402.1, 402.16, 402.17, 222/402.21–402.25, 394; 251/149.8, 349, 354

[56] References Cited

UNITED STATES PATENTS 3,300,105   1/1967   Rosen.......................... 222/402.23 X
3,079,048   2/1963   Wolfson et al................. 222/402.23 X

*Primary Examiner*—Robert B. Reeves
*Assistant Examiner*—John P. Shannon
*Attorney*—Jerome A. Gross

[57] ABSTRACT

A dispensing valve of the type having a tubular elastic seal, utilizes a molded solid dispensing stem seated within it, and an external nozzle. Four ribs on the stem, fitted in a bore of the nozzle, assure tilt movement of the stem equal to that of the actuator. Two opposite ribs terminate within the bore, in end surfaces which permit cross-flow, into the base of an outflow groove which extends inward between the intermediate ribs. On the projecting ends of these are retention portions, shaped like half acorns, which flex into the groove to permit snap assembly.

4 Claims, 6 Drawing Figures

PATENTED MAR 27 1973 3,722,760

DISPENSING VALVE HAVING POSITIVE TILT STEM

BACKGROUND OF THE INVENTION

This invention relates to dispensing valves of a type heretofore used for pressure dispensers such as canned whipped cream. One valve mechanism heretofore used is exemplified by FIG. 7 of the U.S. Pat. to Michel, No. 2,612,293. Such a valve utilizes a rubber sealing member fitted within the top of the dispensing container, having a seat portion within the container and a tubular sleeve extending therethrough. A rivet-like headed stem member is used for valving; it extends with clearance through the sleeve portion of the tubular seal and through a fluted bore of an external nozzle; the upper end of the rivet is headed onto a shoulder within the nozzle at the outlet of the bore. The stem member fits snugly within the flutes of the bore, so as to assure positive stem tilting with the nozzle.

Valves patented subsequently have utilized molded plastic stems with arrowhead tips which flex inward on assembly to pass through a nozzle bore and engage the upper shoulder surface. Such stems are shown in U.S. Pat. Nos. 2,957,610, 2,975,944 and 2,992,760. In order to mold arrowheads which will flex on assembly, using simple molds which split at a parting plane, such arrowheads include only two barb-like portions projecting to opposite sides of a relatively slender top stem portion. Such a stem portion is not only weak; it cannot engage the bore of the nozzle. In using such a valve, the nozzle will tend to tilt through a greater angle than the stem, as illustrated in FIG. 3 of U.S. Pat. No. 2,975,944. If force was applied to the actuator perpendicular to the plane of the arrowhead tip rather than as there illustrated, the discrepancy in angular movement would be even greater.

The purposes of the present invention include providing a readily molded plastic valve stem, suited for snap assembly within the bore of such a nozzle, which on assembly will fit therein with security, so as to transmit angular movement of the nozzle positively to the stem, regardless of direction of tilt. Another purpose is to provide a plastic molded stem with a nozzle tip which not only provides strength as well as snap assembly, but also facilitates the flow of product on dispensing. A still further purpose is to provide a stem design which will permit molding in a simple split mold and yet achieve all the features previously mentioned.

These purposes, and others which will be apparent from the specification, are effected in the manner hereinafter set forth.

SUMMARY OF THE INVENTION

The present invention utilizes a stem designed for molding in such a mold. It is formed along a straight center line to cruciform cross-section. If viewed as for molding in a mold with a horizontal parting plane, the stem may be said to have projecting symmetrical left and right side ribs as well as upper and lower ribs. At its end which is to be mounted within the elastic seal, the stem has a valve-like head. Opposite to it, the upper and lower ribs terminate in cross-flow end surfaces, which coincide with the base of an outflow groove. The left and right ribs are longer; they extend spacedly beyond these cross-flow end surfaces to support retention portions, similar in shape to acorn halves on both sides of the outflow groove. The portions of the left and right ribs on both sides of the outflow groove deflect, so that the retention portions may cam inwardly, thus to permit snap assembly within the bore of a nozzle member. The outer surfaces of the ribs then securely engage the bore, so that a tilting force applied to the nozzle will tilt the stem an equal amount regardless of the direction of force applications. On tilting, when the head is unseated, the product to be dispensed will flow into the bore of the nozzle member between the ribs to reach the cross-flow end surfaces; the product will then flow across these to the outflow groove between the two retention portions.

As an alternate embodiment, narrow grooves may be added in the cylindrical surface of the bore, somewhat like those of the Michel U.S. Pat. No. 2,612,293. However, the number of such grooves should be either three or five, to avoid chance alignment with the four ribs.

DESCRIPTION OF THE PREFERRED EMBODIMENTS

Figure 1:
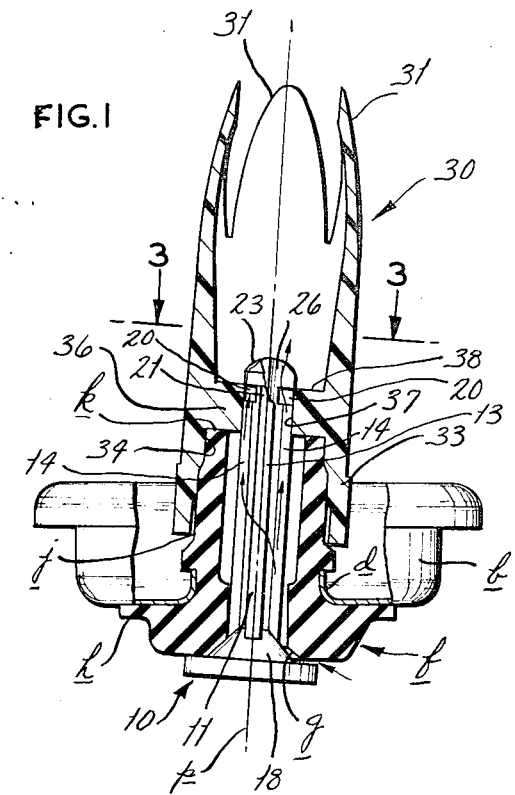
FIG. 1 is a view partly in elevation and partly in section of a dispensing valve embodying the present invention, shown tilted to open position.

Valves of the type referred to are conventionally assembled with a top part of a dispensing container, for mounting sealedly in place after the product to be dispensed has been filled therein. In the drawings, a conventional container top member or mounting cup $b$ has a central flanged aperture $d$. A conventional tubular elastic sealing member generally designated $f$ has an annular seat portion $g$ at its inner lower surface, a flexible-edged flange $h$ which fits sealedly against the under surface of the mounting cup $b$, and a tubular sleeve portion $j$ which extends from the seat portion $g$ outward through the central flange aperture $d$, to terminate in an upper end surface $k$.

Figure 2:
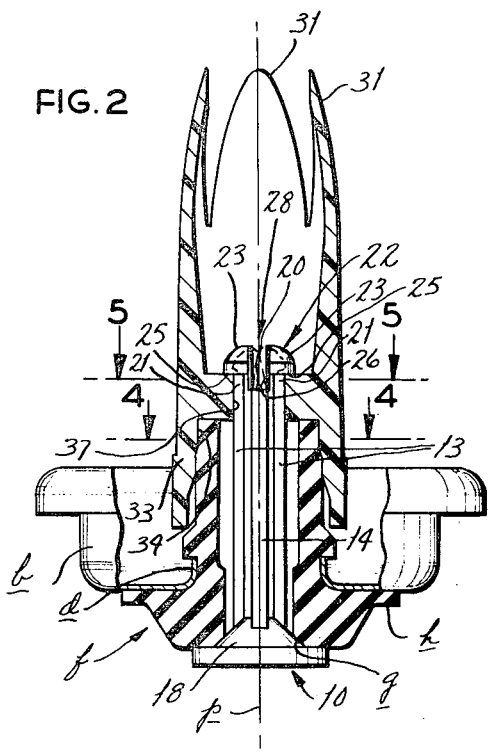
FIG. 2 is a view, taken at 90° to FIG. 1, of the valve in closed position. The phantom lines show the positions of the retention portions when deflected inward during assembly.
Figure 4:
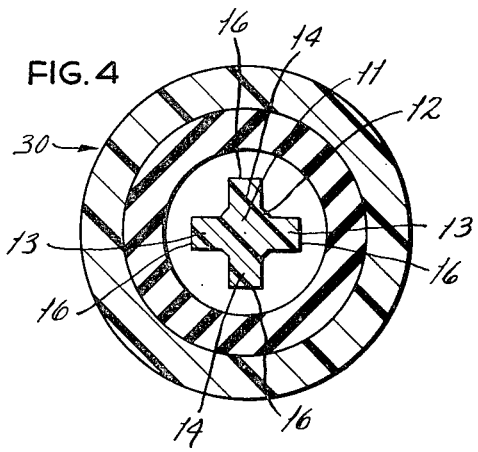
FIG. 4 is an enlarged sectional view taken along line 4—4 of FIG. 2.

The dispensing stem of the preferred embodiment of invention is formed of one of the relatively rigid plastic materials adapted for conventional molding. The dispensing stem, generally designated 10, includes a symmetrical cruciform stem portion 11 best seen in FIG. 4, and having a central part 12 formed along a straight center line $p$. If the stem 10 was laid with its center line $p$ horizontal, as at the parting plane of a conventional split mold, the portion of FIG. 2 showing the stem 10 might be described as looking vertically downward toward the parting plane of the mold. So viewed, the stem 10 may be said to have left and right side ribs 13, and upper and lower ribs 14, projecting outward from the center line $p$ equal radial distances to squared off outer edge rib surfaces 16. The lower portion of the stem 10 is of increased cross-section, for greater strength. At its base is a conventional valve-like head 18 which, when the valve is in closed position as shown in FIG. 2, is sealed against the annular seat portion $g$.

Figure 3:
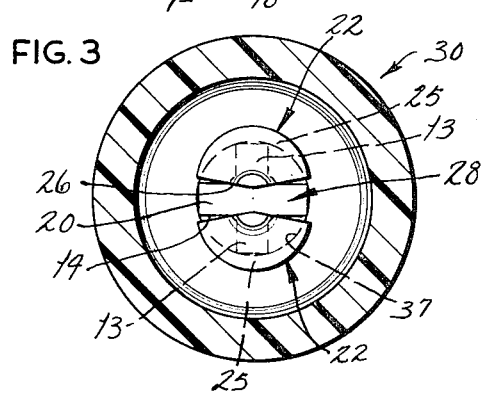
FIG. 3 is an enlarged sectional view taken along line 3—3 of FIG. 1.

At the opposite end of the cruciform stem 11, the upper and lower ribs 14 terminate in cross-flow end surfaces 20, best seen in FIG. 1. The left and right ribs 13 are longer; they have continuing portions 21 which extend like parallel beams, spacedly beyond these end surfaces 20; and are capped by spaced-apart left and right projecting retention portions generally designated 22. These portions 22 are preferably of half-acorn shape having upper surfaces 23 which taper roundedly outward and downward, and which project radially beyond their junctures with the ribs 13 to provide detent lip undersurface portions 25. Viewed from above, as in FIG. 3, each of the retention portions is nearly semi-circular, but their centers are spaced apart, each being outward of the center line $p$. Their inward facing slot surfaces 26 are closest near the center line $p$ and taper broadeningly outward, to a maximum spacing which is preferably broader than the cross-flow end surfaces 20 of the upper and lower ribs 14.

Figure 5:
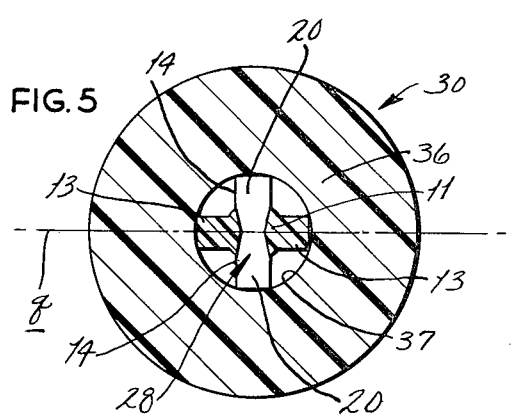
FIG. 5 is an enlarged sectional view taken along line 5—5 of FIG. 2.

The inward facing slot surfaces 26 form the sides of the outflow groove generally designated 28, whose base is integral with the cross-flow end surfaces 20. Referring particularly to FIG. 5, persons skilled in the art will recognize that the stem 10 may be readily molded in a simple mold split oriented with a hypothetical parting plane $q$ horizontal, such mold including tapering mold parts (not shown) extending toward such parting plane whose side surfaces will form the outflow groove 28 and the cross-flow end surfaces 20 which lead to it.

The dispensing valve assembly is completed by a dispensing nozzle generally designated 30, whose external configuration is conventional. The nozzle 30 is a tubular member formed of fairly rigid plastic, thinned at its upper end to provide flexible finger-like dispensing tip projections 31. It has a relatively rigid lower annular skirt portion 33 whose inner surface 34 fits upon the tubular sealing sleeve portion $j$; and a central portion which includes a thick radially inward flange 36. The flange 36 terminates in a cylindrical bore 37 whose radius corresponds substantially with the radial distance from the stem center line $p$ to the outer edge surfaces of its ribs 13, 14. The axial length of the cylindrical bore 37 is substantially greater, preferably several times as great, as the space from the cross-flow end surfaces 20 of the upper and lower ribs 14 to the under surfaces 24 of the retention portions 22. When the valve members are assembled as shown in FIG. 1 and tilted, the outer edge rib surface 16 of all four of the ribs 13, 14 will fit securely within the cylindrical bore 37. On tilting, the stem 10 will be forced to tilt through the same angle as the dispensing nozzle 30, regardless of direction at which the tilting force is applied.

Referring to FIG. 2, the manner of assembly of the valve parts will now be apparent. After the sealing member $f$ has been positioned to extend through the aperture $d$ of the mounting cup $b$, the nozzle 30 is positioned with the under surface of its flange 36 on the upper end surface $k$ of the sealing member $f$. The dispensing stem 10 is then pressed upward through the cylindrical bore 37. The acorn-like retention portions 22 cam inwardly into the outflow groove 28; inward flexure is achieved by bending the beam-like continuing portions 21 of the left and right ribs 13. When the retention portions 22 have passed through the cylindrical bore 37, they snap outward, so that the detent lip portions 25 of their under surfaces engage an annular shoulder 38 which forms the upper surface of the inward flange 36.

In use, when the valve is opened by tilting as shown in FIG. 1, the stem 10 will tilt through the full angle that the dispensing nozzle 30 is tilted. As it bends the rubber sleeve $j$, the head 18 is displaced from the seat $g$. The contents of the container pass between the ribs 13, 14 into the lower portion of the cylindrical bore 37, then across the cross-flow surfaces 20 into the outflow groove 28, thence to flow outward through the dispensing tip projections 31 of the nozzle 30. The taper of the inward facing slot surfaces 26 serves to increase the flow capacity of the assembly; hence the beam-like continuing portions 21 may be made only long enough to provide the inward flexure necessary for assembly, as shown in phantom lines of FIG. 2.

Figure 6:
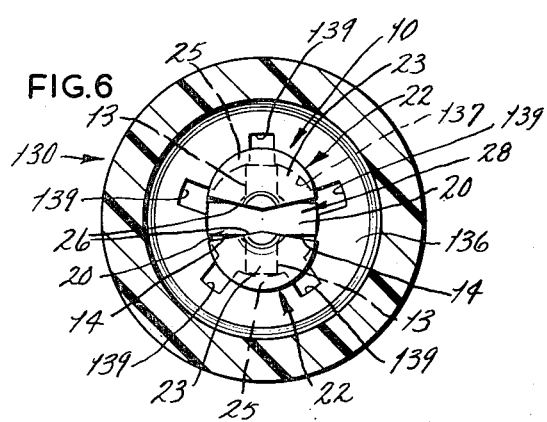
FIG. 6 is a view similar to FIG. 3 of a modified embodiment of the invention.

An alternate embodiment, utilizing a somewhat modified dispensing nozzle generally designated 130, is shown in FIG. 6. All portions of the nozzle 130 not modified are there numbered with the same numbers as the nozzle 30 heretofore described; and the same dispensing stem 10 is used. In the modified embodiment the inward flange 136 corresponds with the flange 36 heretofore described except that its bore 137 has a number of feed grooves 139 at equal angular spacings, which extend the entire axial length of the flange 136 and increase the total flow capacity of the valve assembly. Five such feed grooves 139 are shown. The grooves 139 are narrower than the ribs 13, 14 and extend radially outward a greater distance than the width of the detent lip portions 25. To avoid a chance alignment between them and the ribs 13, 14, the number of grooves 139 is either three or five; that is, either one more or one less than the number of ribs 13, 14.

By the constructions herein described, easy snap assembly of the valve parts is achieved, with assurance that regardless from what direction a tilting force is applied to the nozzle, the dispensing stem 10 will tilt with it through the entire same angle; this enables the user to learn quickly how much nozzle tilt is required for a desired rate of dispensing.

I claim:

1. For use as part of a dispensing valve for tilt opening within an elastic tubular sleeve capped by a nozzle member,
    a dispensing stem formed of plastic material and adapted to be molded in a mold having a parting plane, said dispensing stem comprising
    a stem portion having a central part formed along a straight center line,
    alternate opposed side ribs projecting therefrom, and intermediate ribs extending perpendicularly thereto,
    all said ribs having outer edge surfaces at equal radial distances from the center line,
    the stem having at one end a valve-like head,
    said intermediate ribs terminating in cross-flow end surfaces at the ends opposite to the head, the said alternate ribs being of such length as to extend spacedly beyond said cross-flow end surfaces of the said intermediate ribs, and terminating therebeyond in projecting retention portions separated by a substantially vertical outflow groove extending to meet the cross-flow end surfaces of the said intermediate ribs, the total of the projections of the retention portions beyond the said alternate ribs being less than the width of said vertical groove, whereby inward flexure of the retention portions by bending of those parts of said alternate ribs immediately therebeneath permits snap assembly to and within such nozzle member.

2. A valve stem as defined in claim 1, wherein the vertical slot comprises slot portions narrowest near the center line of the stem and tapering broadeningly outward, whereby to provide increased flow communication to the slot from the cross-flow end surfaces of the said intermediate ribs.

3. A tiltable dispensing valve comprising the stem as defined in claim 1, in combination with a tubular elastic sealing member having an annular seat portion against which the head of said stem may seal, and a sleeve portion extending therefrom to a sleeve end surface, and with a dispensing nozzle having an annular skirt portion adapted to fit about the sealing sleeve portion, the nozzle further having a radially inward flange beyond the sleeve end surface, the flange terminating inwardly in a cylindrical bore whose radius corresponds substantially with the radial distance from the center line of the stem to the outer edge surfaces of its ribs, the axial length of said cylindrical bore being greater than the extent by which the length of the said alternate ribs exceeds that of the said intermediate ribs, whereby the fit of the ribs within the bore assures tilting movement of the stem equal to that of the nozzle.

4. A dispensing valve as defined in claim 3, in which the bore has a plurality of grooves slotted through the cylindrical surface at equal angular spacings, said grooves being narrower than the ribs, there being a difference of one between the number of grooves and the number of ribs, whereby to avoid chance alignment therebetween.

* * * * *